US012673692B2

(12) United States Patent　　　　(10) Patent No.:　US 12,673,692 B2
Bieg　　　　　　　　　　　　　　　　(45) Date of Patent:　　Jul. 7, 2026

(54) METHOD AND DEVICE FOR OPERATING A VEHICLE, AND DRIVING ASSISTANCE SYSTEM FOR A VEHICLE

(71) Applicant: Robert Bosch GmbH, Stuttgart (DE)

(72) Inventor: Hans-Joachim Bieg, Weil im Schoenbuch (DE)

(73) Assignee: ROBERT BOSCH GMBH, Stuttgart (DE)

( * ) Notice: Subject to any disclaimer, the term of this patent is extended or adjusted under 35 U.S.C. 154(b) by 140 days.

(21) Appl. No.: 18/631,291

(22) Filed: Apr. 10, 2024

(65) Prior Publication Data

US 2024/0375679 A1　　Nov. 14, 2024

(30) Foreign Application Priority Data

May 9, 2023　　(DE) ..................... 10 2023 204 260.6

(51) Int. Cl.
　　*B60W 60/00*　　　　(2020.01)
(52) U.S. Cl.
　　CPC ..... *B60W 60/001* (2020.02); *B60W 2420/403* (2013.01); *B60W 2540/225* (2020.02); *B60W 2540/229* (2020.02)
(58) Field of Classification Search
　　CPC ......... B60W 60/001; B60W 2420/403; B60W 2540/225; B60W 2540/229; B60W 50/0097; B60W 50/0098; B60W 60/0011
　　See application file for complete search history.

(56) References Cited

U.S. PATENT DOCUMENTS

2010/0265074 A1 * 10/2010 Namba ................... G06V 10/85
　　　　　　　　　　　　　　　　　　　　　340/576
2020/0057487 A1 * 2/2020 Sicconi ................... G06F 3/011
　　　　　　　　　(Continued)

FOREIGN PATENT DOCUMENTS

DE　　102019207342 A1 * 11/2020 ........... G06F 9/5027
DE　　102019211173 A1　　1/2021
　　　　　　　　　(Continued)

OTHER PUBLICATIONS

EPO machine translated description of DE-102019207342-A1. (Year: 2020).*

*Primary Examiner* — Navid Z. Mehdizadeh
*Assistant Examiner* — Shelley Marie Osterhout
(74) *Attorney, Agent, or Firm* — NORTON ROSE FULBRIGHT US LLP

(57)　　　　ABSTRACT

A method for operating a vehicle. The method includes reading an occupant signal, via an interface from at least one sensor apparatus of the vehicle, which represents a behavior of at least one vehicle occupant detected by the at least one sensor apparatus. A state signal is ascertained using the occupant signal. The state signal represents at least one state of attentiveness of the at least one vehicle occupant. At least one parameter of driving behavior planning for the vehicle is adapted depending on the state signal. A computing capacity required for the adapted driving behavior planning is determined in order to generate a capacity signal. The capacity signal represents a free computing capacity which corresponds to a difference between the required computing capacity and an overall available computing capacity. The free computing capacity is released to execute a function of the vehicle, depending on the capacity signal.

10 Claims, 2 Drawing Sheets

(56)     References Cited

U.S. PATENT DOCUMENTS

| | | | | |
|---|---|---|---|---|
| 2021/0248399 | A1* | 8/2021 | Martin | G06F 3/013 |
| 2021/0303888 | A1* | 9/2021 | McGill | G06N 3/09 |
| 2024/0199082 | A1* | 6/2024 | Balch | B60W 60/0055 |
| 2024/0270280 | A1* | 8/2024 | Kume | B60W 60/001 |

FOREIGN PATENT DOCUMENTS

| | | | |
|---|---|---|---|
| DE | 102020109665 | A1 | 10/2021 |
| DE | 102020122292 | A1 | 3/2022 |
| DE | 102020212376 | A1 | 3/2022 |
| DE | 102021202519 | A1 | 9/2022 |
| DE | 102021112160 | A1 | 11/2022 |
| DE | 102022201219 | B3 | 3/2023 |
| DE | 102021214494 | A1 | 6/2023 |
| DE | 102022109069 | A1 | 10/2023 |

* cited by examiner

300

| read occupant signal | — 305 |

↓

| ascertain state signal | — 310 |

↓

| adapt parameter if driving behavior planning | — 320 |

↓

| determine a computing capacity | — 330 |

↓

| release free computing capacity | — 340 |

↓

400

405 — | unit for driver observation |

↓

410 — | unit to estimate attentiveness of vehicle occupant | unit to provide route information, surroundings information, and/or map data

↓

415 — | driving behavior planning unit |

| | — 420

METHOD AND DEVICE FOR OPERATING A VEHICLE, AND DRIVING ASSISTANCE SYSTEM FOR A VEHICLE

CROSS REFERENCE

The present application claims the benefit under 35 U.S.C. § 119 of German Patent Application No. DE 10 2023 204 260.6 filed on May 9, 2023, which is expressly incorporated herein by reference in its entirety.

FIELD

The present invention is based on a method and a device for operating a vehicle and a driving assistance system for a vehicle. The present invention also relates to a computer program.

BACKGROUND INFORMATION

A core component of autonomous vehicles can be driving behavior planning. In this case, different behaviors such as lane changes, following, cornering or chains of behavior alternatives can be weighed against one another. This can take place, for example, by creating a tree of possible behaviors over a certain planning period. Behavioral planning can be characterized by a rapid increase in complexity, tree size when the planning period is extended and by the consideration of many possible behavioral alternatives in each planning step. For this purpose, heuristics can be used for reducing planning alternatives, i.e. trimming or so-called pruning of the tree.

SUMMARY

The approach presented here provides an improved method for operating a vehicle and a driving assistance system for a vehicle, a device that uses this method, and a corresponding computer program. Advantageous developments and improvements of the method and device disclosed herein are made possible by the measures disclosed herein.

With the approach presented here according to the present invention, driving behavior planning can be reliably adapted, as a result of which driving comfort and driving safety can be improved.

A method for operating a vehicle is presented. According to an example embodiment of the present invention, the method includes a step of reading an occupant signal via an interface from at least one sensor apparatus of the vehicle. The occupant signal represents a behavior of at least one vehicle occupant detected by the at least one sensor apparatus. In an ascertainment step, a state signal is ascertained using the occupant signal. The state signal represents at least one state of attention of the at least one vehicle occupant. In an adaptation step, at least one parameter of driving behavior planning for the vehicle is adapted depending on the state signal. In a determination step, a computing capacity required for the adapted driving behavior planning is determined in order to generate a capacity signal. The capacity signal represents a free computing capacity which corresponds to a difference between the required computing capacity and an overall available computing capacity. In a release step, the free computing capacity is released to execute a function of the vehicle, depending on the capacity signal.

The vehicle can be understood to be, for example, an at least partially autonomously operated vehicle. The at least one vehicle occupant can be a driver of the vehicle or a passenger of the vehicle. A viewing direction of the at least one vehicle occupant and/or a use of at least one object by the vehicle occupant can be detected as behavior. The state of attentiveness can be understood to be an attentive state or an inattentive state. Driving behavior planning can be the planning of a route for the vehicle. Computing capacity can be understood to mean computing resources.

The approach of the present invention presented here can lead to an improvement of methods for driving behavior planning. This can be particularly advantageous for rapidly increasing complexity in the case of many behavioral decisions and long planning periods. This is done by trimming the tree of behavior alternatives, taking into account the driver or occupant state. The approach presented here can allow a connection of components for driver observation or occupant observation and vehicle automation. Furthermore, a method for calculating the state of attentiveness of the driver and/or the occupants can be realized, as well as a method for using information about the state of attentiveness of the driver or the occupants in order to allow a reduction of the planning complexity without losses in driving comfort. In turn, the freed-up computing resources can make an increase in driving comfort at a different location possible; for example, for improving estimation of the behavior of other road users, for optimizing trajectory planning, and/or for infotainment power. Alternatively, a cost reduction can take place by means of the approach presented here, as a result of lower power requirements for the hardware of the particular control unit. In other words, an increase in the optimality of the behavioral decision can be made possible, and losses, in particular in the area of driving comfort, can therefore be prevented. The approach presented here can therefore also be understood or referred to as taking into account the state of the driver in driving behavior planning.

According to an example embodiment of the present invention, in the adaptation step, at least one parameter for driving behavior planning can be adapted, which parameter represents an activation state of at least one functional component of the driving behavior planning. The activation state can be an activated, deactivated or partially activated state of the at least one functional component of the driving behavior planning. Advantageously, this means that not only can one parameter of the planning component be adapted, but significant parts of a core system of an automated vehicle can be switched off, for example.

According to an example embodiment of the present invention, in the adaptation step, at least one parameter for a route for the vehicle planned by means of the driving behavior planning can be adapted. The parameter can represent a weighting for a duration of the planned route. Depending on the ascertained state of attentiveness of the at least one vehicle occupant, a route with a long travel time or a short travel time can be planned. Depending on the state of attentiveness, the computing capacity required for such planning can thus be reduced, which capacity can then be made available to other functions.

According to an example embodiment of the present invention, in the adaptation step, at least one parameter for a route for the vehicle planned by means of the driving behavior planning can be adapted. The parameter can represent a number of alternative routes for the planned route. Depending on the state of attentiveness, the number of alternative routes can be displayed to the at least one vehicle occupant, for example via an infotainment apparatus. In this way, depending on the state of attentiveness, other uses of the freed-up computing capacity can optionally be made possible.

According to an example embodiment of the present invention, in the reading step, the occupant signal can be read via the interface from a vehicle camera, and additionally or alternatively from a position sensor, and additionally or alternatively from an infotainment apparatus of the vehicle. The vehicle camera can, for example, be arranged in the region of a windshield of the vehicle, so that the at least one vehicle occupant and additionally or alternatively the interior of the vehicle can be reliably detected. In this way, reliable and meaningful data about the behavior of vehicle occupants can be obtained.

According to an example embodiment of the present invention, in the reading step, the occupant signal can represent an arrangement of the at least one vehicle occupant in the vehicle. The vehicle occupant can, for example, be situated on a driver's seat. An even more accurate determination of the state of attentiveness can thus be made possible.

According to an example embodiment of the present invention, in the reading step, the occupant signal can represent a viewing direction of the at least one vehicle occupant and additionally or alternatively a use of at least one object by the at least one vehicle occupant in the vehicle. Taking into account the viewing direction and/or the use of an object, the state of attentiveness can be reliably ascertained.

According to an example embodiment of the present invention, in the ascertainment step, an inattentive or attentive state of the at least one vehicle occupant can be ascertained as the state of attentiveness. The inattentive state can be ascertained as a short-term inattentive or long-term inattentive state. A change between the inattentive and the attentive state can be reliably ascertained. Taking into account the ascertained state of attentiveness, driving behavior planning can be reliably adapted.

According to an example embodiment of the present invention, in the release step, the free computing capacity can be released to control an infotainment apparatus. For example, information about the planned route can be displayed to the at least one vehicle occupant when an attentive state has been ascertained. This can increase the driving comfort of the at least one vehicle occupant.

According to an example embodiment of the present invention, in the release step, the free computing capacity can be released to control planning of trajectories within a driving path planned by means of the driving behavior planning. Planning of a detailed trajectory can thus be improved. In particular, precisely where to drive in the possible driving path in order to increase driving comfort, for example, can be determined. This can contribute to an improvement in driving safety and/or driving comfort.

According to an example embodiment of the present invention, in the release step, the free computing capacity can be released in order to control a monitoring apparatus for monitoring surroundings of the vehicle. This can take place, for example, in the case of an ascertained inattentive state of the at least one vehicle occupant and thus contributes to an improvement in driving safety.

The ascertainment step can be carried out using a machine learning method. The advantages of the approach of the present invention described here can also be realized very efficiently by such an embodiment.

This method can be implemented, for example, in software or hardware or in a mixed form of software and hardware, for example in a control device.

The approach of the present invention presented here further provides a device which is designed to carry out, control or implement the steps of a variant of a method presented here in corresponding apparatuses. The object of the present invention can also be achieved quickly and efficiently by this design variant of the present invention in the form of a device.

For this purpose, according to an example embodiment of the present invention, the device can have at least one computing unit for processing signals or data, at least one memory unit for storing signals or data, at least one interface to a sensor or an actuator for reading sensor signals from the sensor or for outputting data signals or control signals to the actuator, and/or at least one communication interface for reading or outputting data embedded in a communication protocol. The computing unit can, for example, be a signal processor, a microcontroller or the like, and the memory unit can be a flash memory or a magnetic memory unit. The communication interface can be designed to read or output data wirelessly and/or in a wired form, a communication interface, which can read or output wired data, being able to read these data, for example electrically or optically, from a corresponding data transmission line, or being able to output these data into a corresponding data transmission line.

In the present case, a device can be understood to be an electrical device that processes sensor signals and, on the basis of these signals, outputs control and/or data signals. The device can have an interface that can be designed as hardware and/or software. In a hardware embodiment, the interfaces can, for example, be part of a so-called system ASIC, which contains a wide variety of functions of the device. However, it is also possible for the interfaces to be separate integrated circuits or at least partially consist of discrete components. In the case of a software embodiment being used, the interfaces can be software modules that are present, for example, on a microcontroller in addition to other software modules.

A driving assistance system for a motor vehicle has an embodiment of a device mentioned herein. In addition, the driving assistance system has the at least one sensor apparatus. The driving assistance system and the sensor apparatus are connected to each other for signal transmission. The advantages of the approach described here can also be realized very efficiently by such an embodiment.

A computer program product or a computer program having program code that can be stored on a machine-readable carrier or storage medium, such as a semiconductor memory, a hard disk memory, or an optical memory, and that is used for carrying out, implementing, and/or controlling the steps of the method according to one of the embodiments of the present invention described above is advantageous as well, in particular when the program product or program is executed on a computer or a device.

Exemplary embodiments of the approach of the present invention presented here are illustrated in the figures and explained in more detail in the following description.

DETAILED DESCRIPTION OF EXAMPLE EMBODIMENTS

In the following description of advantageous exemplary embodiments of the present invention, the same or similar reference signs are used for the elements shown in the various figures and acting similarly, as a result of which a repeated description of these elements is omitted.

Figures 1, 2:
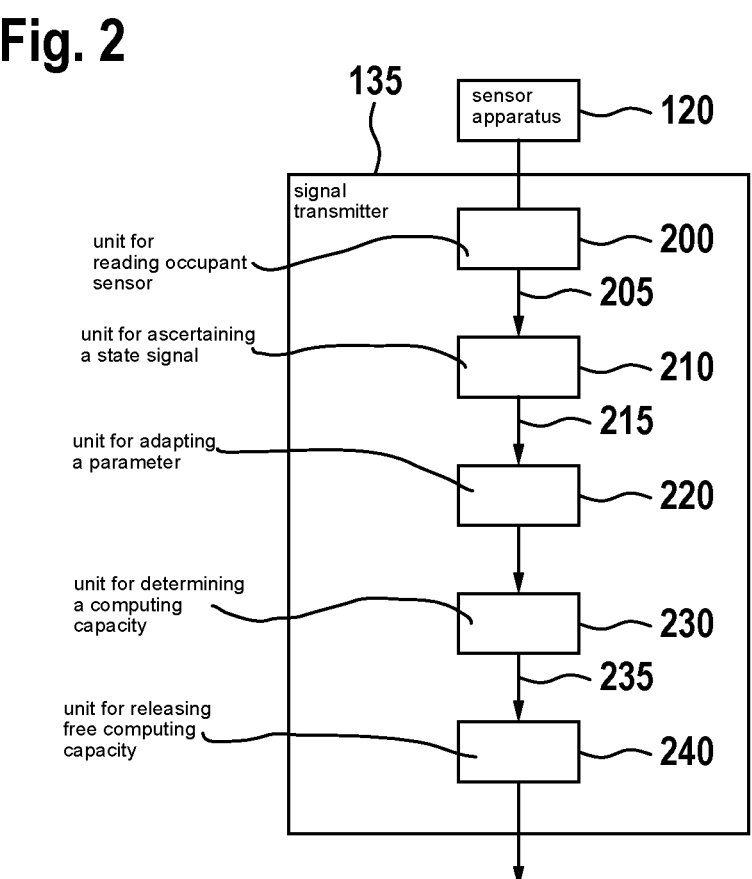
FIG. 1 is a schematic representation of a vehicle with an exemplary embodiment of a driving assistance system according to the present invention.
FIG. 2 is a block diagram of an exemplary embodiment of a device for operating a vehicle, according the present invention.

FIG. 1 is a schematic representation of a vehicle 100 with an exemplary embodiment of a driving assistance system 125. The vehicle 100 is designed, for example, as an autonomously operated vehicle and for this purpose has the driving assistance system 125. The driving assistance system 125 has a device 135 which is connected to a sensor apparatus 120 for signal transmission. In this case, the sensor apparatus 120 is arranged merely by way of example in the region of a windshield 150 of the vehicle 100 and is designed, for example, as a vehicle camera. In the representation shown here, one vehicle occupant 105 and another vehicle occupant 115 are situated, merely by way of example, in the vehicle 100. In this case, the vehicle occupant 105 is situated merely by way of example on a driver's seat of the vehicle 100 and the additional vehicle occupant 115 is situated on a rear seat of the vehicle 100. The sensor apparatus 120 is designed to detect the vehicle occupant 105 and/or the additional vehicle occupant 115 in the vehicle 100.

According to one embodiment, the vehicle 100 has a position sensor 130 which is connected to the device 135 for signal transmission and is designed to detect a position of at least one of the vehicle occupants 105, 115. Additionally or alternatively, the position sensor 130 is designed to ascertain a position of the vehicle 100 and/or a position of at least one adjacent vehicle.

The vehicle 100 has, for example, an infotainment apparatus 140 which is also connected to the device 135 for signal transmission. The infotainment apparatus 140 is arranged, for example, in the region of the driver's seat and designed to display information for at least one of the vehicle occupants 105, 115, for example information about a route.

In a standby state, the sensor apparatus 120 detects the at least one vehicle occupant 105 and/or a behavior of the at least one vehicle occupant 105. According to one exemplary embodiment, only the vehicle occupant 105 is detected, since the vehicle occupant 105 is situated on the driver's seat. For example, a viewing direction of the vehicle occupant 105 is detected and/or a behavior, such as a use of an object, such as a mobile phone or a book, for example.

The data detected by the sensor apparatus 120 are read, for example, by the device 135 and processed there. Using the data, a state of attentiveness of the vehicle occupant 105 is ascertained by means of the device 135. An attentive state is, for example, ascertained as the state of attentiveness when a viewing direction of the vehicle occupant 105 is detected in the direction of the windshield 150. An inattentive state of the vehicle occupant 105 is ascertained if, for example, a viewing direction of the vehicle occupant 105 is detected in the direction of a glove compartment and/or a use of a mobile phone or, for example, a book is detected as behavior. The state of attentiveness is also ascertained, for example, depending on a positioning of the vehicle occupants 105, 115. If the vehicle occupant 105 sits on the driver's seat, an attentive state is assumed, for example.

Depending on the ascertained state of attentiveness of the vehicle occupant 105, driving behavior planning for the vehicle 100 is adapted by means of the device 135, for example. This is, for example, a plan of a route for the vehicle 100. If an inattentive state of the vehicle occupant 105 is ascertained, a route for the vehicle 100, for example, is planned which may have a longer driving time than a comparable route, but has less traffic congestion. Alternative routes are, for example, neither planned nor proposed to the vehicle occupant 105. Since the state of attentiveness of the vehicle occupant 105 was previously detected as an inattentive state, it is possible to dispense with the display of information about the route and/or the display of alternative routes via the infotainment apparatus 140. Computing capacity is required for the planning of the driving behavior planning. In the embodiment mentioned here, for example, less of the required computing capacity is used, since, for example, no alternative routes are planned, but rather only one route. The remaining computing capacity is thus released by means of the device 135 and can be used to execute a function of the vehicle 100. For example, it is possible to release the free computing capacity to a monitoring apparatus, which is designed, for example, to monitor surroundings of the vehicle 100. Additionally or alternatively, it is possible to release the free computing capacity to the infotainment apparatus 140 and/or to use the free computing capacity for planning trajectories within a driving path planned by means of the driving behavior planning.

If an attentive state of the vehicle occupant 105 is ascertained, a plurality of routes are suggested to the vehicle occupant 105 via the infotainment apparatus 140 by means of the device 135, for example during the driving behavior planning, from which suggested routes the vehicle occupant 105 selects a route. The selected route is displayed, for example, during travel via the infotainment apparatus 140. Thus, for example, the entire available computing capacity is required for this driving behavior planning, as a result of which no computing capacity can be released for another function of the vehicle 100.

The state of attentiveness of the vehicle occupant 105 is ascertained by means of the device 135, for example before a start of a journey. According to one exemplary embodiment, the state of attentiveness of the vehicle occupant 105 is also continuously ascertained while traveling at predefined time intervals in order to detect, for example, a duration of the particular state of attentiveness and/or a change between the attentive state and the inattentive state. If the state of attentiveness of the vehicle occupant 105 changes from an attentive state to an inattentive state while traveling, for example, the route is no longer displayed via the infotainment apparatus 140 by means of the device 135, merely by way of example, and the computing capacity that this frees up is released for the monitoring apparatus, for example.

In other words, the approach presented here includes a technical connection between components for planning the automated journey, such as a control device and planning software, in this case the device 135, and components for passenger or driver observation, such as camera hardware and analysis software and infotainment components, in this case the sensor apparatus 120. The prerequisite is, for example, that different information is provided by the infotainment apparatus 140, which can also be referred to as an infotainment component, or by the sensor apparatus 120, which can also be referred to as a component for occupant or driver observation. For occupant or driver observation, these are, for example, the viewing direction of the vehicle occupant 105, who can also be referred to as a driver, objects in the interior and/or the behavior of the vehicle occupant 105. Other investigated questions include, for example, the following: is the viewing direction, for example, directed toward the road/relevant to driving or directed toward the interior or toward an object in the interior? Is there a book, a smartphone or a newspaper in the vehicle 100, and/or being used by the vehicle occupant 105? Is the vehicle occupant 105, for example, busy with a secondary task, such as using the smartphone or reading, or is he carefully observing the traffic situation? For the infotainment apparatus 140, which can also be referred to as an infotainment system, this would be the following information: the status of the infotainment apparatus 140—for example, is a movie currently playing? Information about past user interactions of the last x seconds.

In addition, the approach presented here includes an estimation of the state of attentiveness carried out by means of the device 135, which can also be referred to as occupant or driver attentiveness. This is represented in binary form, for example, i.e. attentive—inattentive, and is based on various conventional methods, for example a calculation of the percentage road center, PRC for short, or a direct classification of the secondary task using machine learning methods. The state of attentiveness is calculated by means of the device 135, for example as an average value of the individual estimates of attentiveness of all occupants. Alternatively, there is also a general weighting depending on the seat. In this case, for example, there is a general assumed reduction of attentiveness in the rear seats and a generally assumed higher attentiveness for persons in the driver's seat. Alternatively, there is also an evaluation of the longevity of the state of the driver. If, for example, gaze deviations are only observed in phases, a short-term inattentiveness is transmitted. If longer phases of gaze deviations or interaction with objects are observed, longer term inattentiveness is assumed.

In addition, the approach presented here includes a transmission of the information regarding occupant or driver attentiveness to the planning component and taking into account this information for optimizing the planning. An adaptation of methods for planning, taking into account the state of the driver by means of the device 135, is expressed, for example, as follows:

if inattentiveness is established, a greater tolerance of the vehicle occupant 105 or of the additional vehicle occupant 115 is to be expected with regard to non-optimal driving behavior selection. This relates in particular to criteria such as the driving time to an intermediate destination, for example the next exit, as typically used as a term for cost evaluation of behaviors in planning methods. In order to exploit this tolerance, there is a stronger trimming of behavior alternatives with the aid of further simplified heuristics which, for example, do not contain any driving time terms. The necessary calculation steps for behavior planning, and thus also the computing load of the device 135, are reduced. The freed-up computing capacity is now usable in other ways.

In addition, when inattentiveness is established, the number of considered behavior alternatives can generally be reduced, for example the reduction of bifurcation factors, which can also be referred to as branching factors. In the case of attentive vehicle occupants 105, 115, if possible lane change or gap following behaviors are observed at all times, for example, this can be omitted, or can take place only at longer intervals when the vehicle occupants 105, 115 are classified as inattentive.

To optimize the comfort of the journey, an improvement of other aspects of the journey is achieved by means of the device 135 with the freed-up computing capacity. For example, more computing capacity can be used for the prediction of the driving behavior of other road users in order to prevent strong braking and the resulting forces on the vehicle occupants 105, 115 when approaching a decelerating vehicle in front or when a vehicle cuts in, and thus to drive more comfortably. Alternatively, the freed-up computing capacity is also used in trajectory planning in order to optimize the driving behavior of the vehicle 100 independently of predicted driving behavior of other participants and to minimize, for example, the occurrence of disruptive forces on the vehicle occupants 105, 115. Alternatively, depending on the architecture of the device 135, the freed-up computing capacity is also used completely elsewhere, for example for the infotainment apparatus 140.

Alternatively, a more precise determination of the secondary task, for example also by coupling with the infotainment apparatus 140, results in an adjustment of driving time-specific cost terms. When there is, for example, only short-term inattentiveness, only a reduction is implemented; when there is assumed long-term inattentiveness, a complete elimination of the term is implemented.

FIG. 2 is a block diagram of a device 135 for operating a vehicle. In this case, the device 135 is similar or corresponds to the device from FIG. 1. The device 135 is designed to carry out and/or control the method from FIG. 3 or a similar method.

The device 135 has a unit 200 for reading an occupant signal 205, a unit 210 for ascertaining a state signal 215, a unit 220 for adapting a parameter of driving behavior planning for the vehicle, a unit 230 for determining a computing capacity required for the adapted driving behavior, and a unit 240 for releasing free computing capacity.

The unit 200 is designed to read the occupant signal 205 from the sensor apparatus 120 via an interface. The occupant signal 205 represents at least one vehicle occupant in the vehicle. The unit 210 for ascertaining is designed to ascertain a state signal 215 using the occupant signal 205. The state signal 215 represents a state of attentiveness of the at least one vehicle occupant. For example, an attentive state or an inattentive state of the vehicle occupant is ascertained as the state of attentiveness. The unit 220 is designed to adapt at least one parameter of driving behavior planning for the vehicle depending on the state signal 215. The unit 230 for determining is designed to determine a computing capacity required for the adapted driving behavior planning and to generate a capacity signal 235 in response thereto. The capacity signal 235 represents a free computing capacity which corresponds to a difference between the required computing capacity and an overall available computing capacity. The unit 240 for releasing is designed to release the free computing capacity for executing a function of the vehicle, depending on the capacity signal 235.

Figures 3, 4:
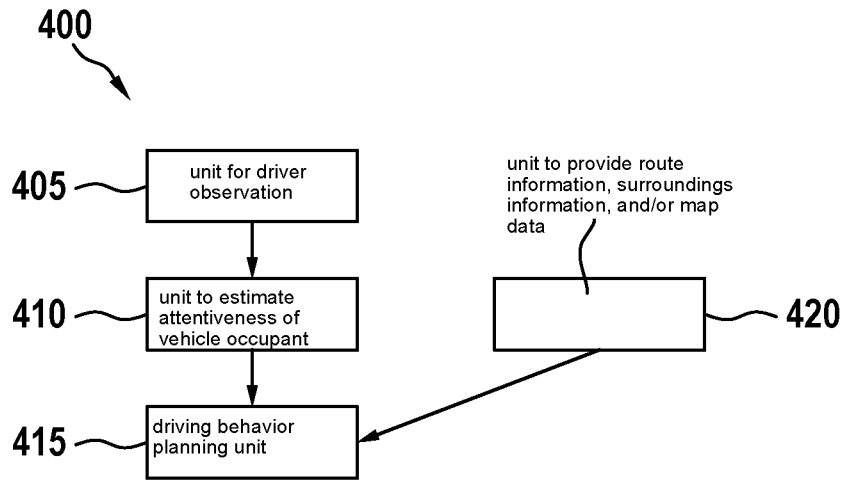
FIG. 3 is a flow chart of an exemplary embodiment of a method for operating a vehicle, according to the present invention.
FIG. 4 is a block diagram of an exemplary embodiment of a device for operating a vehicle, according to the present invention.

FIG. 3 is a flowchart of an exemplary embodiment of a method 300 for operating a vehicle. In this case, the vehicle resembles or corresponds to the vehicle from one of the figures described herein. The method 300 for operating can be executed using the device from one of the figures described herein or a similar device.

The method 300 comprises a step 305 of reading an occupant signal, a step 310 of ascertaining a state signal, a step 320 of adapting a parameter of driving behavior planning for the vehicle, a step 330 of determining a computing capacity required for the adapted driving behavior, and a step 340 of releasing free computing capacity.

In the reading step 305, the occupant signal is read via an interface from a sensor apparatus, for example a vehicle camera, and/or a position sensor, and/or an infotainment apparatus. The occupant signal represents a behavior of the at least one vehicle occupant detected by the sensor apparatus, for example a viewing direction and/or a use of at least one object by the at least one vehicle occupant.

In the ascertainment step 310, the state signal is ascertained using the occupant signal. The state signal represents a state of attentiveness of the at least one vehicle occupant, for example an inattentive state or an attentive state. The inattentive state is ascertained in the ascertainment step 310, for example as a short-term inattentive or long-term inattentive state. According to one embodiment, the ascertainment step 310 is carried out using a machine learning method.

In the adaptation step 320, at least one parameter of driving behavior planning for the vehicle is adapted depending on the state signal. According to one embodiment, at least one parameter for driving behavior planning is adapted, which parameter represents an activation state of at least one functional component of the driving behavior planning. According to one embodiment, a parameter for a route for the vehicle planned by means of the driving behavior planning is adapted. The parameter represents, for example, a weighting of a duration of the planned route. Additionally or alternatively, the parameter represents a number of alternative routes for the planned route.

In the determination step 330, a computing capacity required for the adapted driving behavior planning is determined in order to generate a capacity signal. The capacity signal represents a free computing capacity which corresponds to a difference between the required computing capacity and an overall available computing capacity.

In the release step 340, the free computing capacity is released depending on the capacity signal in order to execute a function of the vehicle. According to one exemplary embodiment, the free computing capacity is released in order to control an infotainment apparatus. Additionally or alternatively, the free computing capacity is released in order to control a planning of trajectories within a driving path planned by means of the driving behavior planning, and/or to control a monitoring apparatus for monitoring surroundings of the vehicle.

Steps 305, 310, 320, 330, 340 of the method 300 can be carried out repeatedly and/or continuously.

FIG. 4 is a block diagram of an exemplary embodiment of a device 400 for operating a vehicle. The device 400 corresponds to or resembles the device from one of the figures described above, wherein function blocks of the device 400 can be designated in different groupings.

The device 400 has a unit 405 for driver observation, a unit 410 for estimating attentiveness, and a unit 415 for planning driving behavior. According to one exemplary embodiment, the unit 405 is designed to observe the at least one vehicle occupant. The unit 410 is designed to estimate, for example, the attentiveness of the vehicle occupant. Subsequently, driving behavior planning is performed in unit 415, wherein unit 415 is provided with information from a unit 420. This information is, for example, route information, surroundings information, and/or map data.

If an exemplary embodiment has an "and/or" link between a first feature and a second feature, this is to be understood to mean that the exemplary embodiment according to one example has both the first feature and the second feature and, according to a further exemplary example, either only the first feature or only the second feature.

What is claimed is:

1. A method for operating a vehicle, comprising the following steps:
   reading an occupant signal via an interface from at least one sensor apparatus of the vehicle, wherein the occupant signal represents a behavior of at least one vehicle occupant detected by the at least one sensor apparatus;
   ascertaining a state signal using the occupant signal, wherein the state signal represents at least one state of attentiveness of the at least one vehicle occupant;
   adapting at least one parameter of driving behavior planning for the vehicle, depending on the state signal, wherein in the adaptation step, a first parameter and a second parameter for a route for the vehicle planned using the driving behavior planning are adapted, wherein the first parameter represents a weighting of a duration of the planned route and the second parameter represents a number of alternative routes for the planned route;
   determining a computing capacity required for the adapted driving behavior planning to generate a capacity signal that represents a free computing capacity which corresponds to a difference between the required computing capacity and an overall available computing capacity; and
   releasing the free computing capacity for executing a function of the vehicle, depending on the capacity signal.

2. The method according to claim 1, wherein, in the reading step, the occupant signal is read via the interface from: (i) a vehicle camera of the vehicle, and/or (ii) a position sensor of the vehicle, and/or (iii) an infotainment apparatus of the vehicle.

3. The method according to claim 1, wherein the occupant signal read in the reading step represents an arrangement of the at least one vehicle occupant in the vehicle.

4. The method according to claim 1, wherein the occupant signal read in the reading step represents: (i) a viewing direction of the at least one vehicle occupant and/or (ii) a use of at least one object by the at least one vehicle occupant in the vehicle.

5. The method according to claim 1, wherein, in the ascertainment step, an inattentive or attentive state of the at least one vehicle occupant is ascertained as the state of attentiveness, wherein the inattentive state is ascertained as a short-term inattentive state or a long-term inattentive state.

6. The method according to claim 1, wherein in the release step, the free computing capacity is released to control an infotainment apparatus.

7. The method according to claim 1, wherein in the release step, the free computing capacity is released to control a planning of trajectories within a driving path planned using the driving behavior planning.

8. The method according to claim 1, wherein the ascertainment step is carried out using a machine learning method.

9. A device configured to operate a vehicle, the device configured to:

read an occupant signal via an interface from at least one sensor apparatus of the vehicle, wherein the occupant signal represents a behavior of at least one vehicle occupant detected by the at least one sensor apparatus;

ascertain a state signal using the occupant signal, wherein the state signal represents at least one state of attentiveness of the at least one vehicle occupant;

adapt at least one parameter of driving behavior planning for the vehicle, depending on the state signal, wherein in the adaptation step, a first parameter and a second parameter for a route for the vehicle planned using the driving behavior planning are adapted, wherein the first parameter represents a weighting of a duration of the planned route and the second parameter represents a number of alternative routes for the planned route;

determine a computing capacity required for the adapted driving behavior planning to generate a capacity signal that represents a free computing capacity which corresponds to a difference between the required computing capacity and an overall available computing capacity; and release the free computing capacity for executing a function of the vehicle, depending on the capacity signal.

10. A non-transitory machine-readable storage medium on which is stored a computer program for operating a vehicle, the computer program, when executed by a computer, causing the computer to perform the following steps:

reading an occupant signal via an interface from at least one sensor apparatus of the vehicle, wherein the occupant signal represents a behavior of at least one vehicle occupant detected by the at least one sensor apparatus;

ascertaining a state signal using the occupant signal, wherein the state signal represents at least one state of attentiveness of the at least one vehicle occupant;

adapting at least one parameter of driving behavior planning for the vehicle, depending on the state signal, wherein in the adaptation step, a first parameter and a second parameter for a route for the vehicle planned using the driving behavior planning are adapted, wherein the first parameter represents a weighting of a duration of the planned route and the second parameter represents a number of alternative routes for the planned route;

determining a computing capacity required for the adapted driving behavior planning to generate a capacity signal that represents a free computing capacity which corresponds to a difference between the required computing capacity and an overall available computing capacity; and releasing the free computing capacity for executing a function of the vehicle, depending on the capacity signal.

* * * * *